United States Patent [19]
Skjold

[11] Patent Number: 5,345,693
[45] Date of Patent: Sep. 13, 1994

[54] METHOD FOR DRYING, ESPECIALLY WASTE MATERIAL, SUCH AS SHRIMP OR CRAYFISH SHELL, FISH OFFAL, ETC.

[75] Inventor: René Skjold, Roslev, Denmark
[73] Assignee: Nutec ApS, Roslev, Denmark
[21] Appl. No.: 956,021
[22] PCT Filed: Jun. 6, 1990
[86] PCT No.: PCT/DK90/00137
   § 371 Date: Dec. 3, 1992
   § 102(e) Date: Dec. 3, 1992
[87] PCT Pub. No.: WO91/19144
   PCT Pub. Date: Dec. 12, 1991
[51] Int. Cl.$^5$ ................................. F26B 7/00
[52] U.S. Cl. ........................... 34/395; 34/61; 34/62; 34/428; 34/443; 34/491; 34/594
[58] Field of Search ............ 34/12, 60, 61, 62, 8, 34/10, 13, 20, 22, 29, 34, 54, 57 R, 57 E, 226, 15, 92

[56] References Cited

U.S. PATENT DOCUMENTS

| | | | |
|---|---|---|---|
| 2,588,865 | 3/1952 | Moldenhauer | 99/2 |
| 3,140,202 | 7/1964 | Naborney | 127/63 |
| 3,360,870 | 1/1968 | Stephanoff | 34/57 |
| 4,070,765 | 1/1978 | Hovmand et al. | 34/12 |
| 4,226,027 | 10/1980 | Albus | 34/57 R |

FOREIGN PATENT DOCUMENTS 442023 11/1985 Sweden .

*Primary Examiner*—Denise Gromada
*Attorney, Agent, or Firm*—Michael L. Dunn; Mark G. Bloom

[57] ABSTRACT

Offal material, such as shrimp or crab shells, fish offal, etc, is dried to produce a fine-grained base material or additive for use in foodstuffs and animal fodder by subjecting a starting material in a chamber to a turbulent air current which accelerates the material lumps into various paths of movement. Hereby the material lumps continuously collide with each other, thereby constantly exposing new surfaces or rupture. The chamber is supplied with air, having a temperature which partly depends on the temperature of the starting material and partly depends on the comminution rate, in an amount adjusted according to the amount of starting material introduced per time unit. Hereby it is achieved that free water is immediately removed from the exposed surfaces of rupture by evaporation. By exerting a counter-pressure, the material is retained in the chamber until a desired particle size has been achieved. If the particles discharged from the chamber are oversize, they are separated off and returned to the inlet of the chamber.

4 Claims, No Drawings

METHOD FOR DRYING, ESPECIALLY WASTE MATERIAL, SUCH AS SHRIMP OR CRAYFISH SHELL, FISH OFFAL, ETC.

The present invention relates to a method for drying, especially waste material, such as crustacean offal, fish offal, etc., to produce a fine-grained base material or additive for foodstuffs or animal fodder, whereby the starting material, optionally after coarse comminution, is passed to a chamber in which it is accelerated in a turbulent air current into various paths of movement, so that the material lumps continuously collide with each other, whereby they are decomposed into smaller and smaller pieces, thereby continuously exposing new surfaces of rupture.

Today, waste products from the fish processing industry, e.g. heads or claws of sea crab, shrimp offal, offal from crayfish, fish etc., are today destroyed or used mainly for animal fodder. A small part of these products is, however, subjected to boiling, drying and pulverizing treatment, whereafter they are used as stock or flavour extract. Traditionally, the extract is produced by air-drying the starting material, and subsequently grinding the dried material. The material may also be boiled dry or freeze- dried, either cut into small lumps or partly boiled down. Because of the very high initial costs and the large energy consumption direct freeze-drying is only used to a limited extent in spite of the fact that this method results in the taste-wise best product. Consequently, drying a partially boiled down product or spray-drying extracts are therefore the most used processes, but at the same time they have the effect that the quality of the end product becomes so poor that it is only usable to a limited extent. A large portion of the flavour agents which are bound in the tissue of the product is not sufficiently released by the processes used today.

Normally only the "soft" part of the fish or shellfish offal is used, while the "hard" part, such as shells and claws, which also contain flavour agents and large amounts of pigments, is lost.

It is the object of the invention to devise a method whereby the product is gently dried while retaining the flavour agents and pigments under a low specific heat consumption. Additionally, the drying should be performed in such a way as to achieve optimum removal of the water in the product. The water is present in the product partly as free water and partly as bound water. Together with the traditional drying methods (convection) the speed of drying is high to begin with as the free water on the surface rapidly evaporates, whereas the capillary conveyance of the "bound" water from the interior of the product towards its surface is considerably slower.

Summing up, it is an object of the invention to provide 1. a method for drying fish or shellfish, either whole or in smaller pieces;
2. a method whereby large pieces of the product are divided into small pieces or pulverized during the drying;
3. a method whereby the water content in the product prior to the drying is high, but very low after the drying;
4. a method whereby the temperature increase in the product is low;
5. a method whereby the specific heat consumption during the drying is low, and
6. a method whereby flavour constituents and pigments in the product are released and retained quality-wise.

These objects are achieved in that the air passed to the drying chamber is imparted partly with the inlet temperature of the starting material, and partly with the temperature which is determined by the decomposition rate, and the air is added in an amount adjusted according to the amount of starting material introduced per time unit, so that the free water is immediately removed from the exposed surfaces of rupture by evaporation, and so that the material is retained in the chamber by way of an exerted counter-pressure until a predetermined size of the pieces or particles has been achieved.

According to the invention, to ensure rapid drying under minimal temperature and gradient formation in the product, a continuous exposure of new wet surfaces takes place from which the water immediately evaporates by convection.

On account of the exposure of new surfaces, the original surface area gets at least 75–250 times larger, dependent upon the size of the starting products and end products, as a result of which the drying is restricted to a strict surface drying. The drying rate thereby becomes directly dependent on the rate at which (a) new surfaces are exposed and (b) heat energy is supplied. According to the invention these preconditions can be arranged as rapid progressions, and consequently a very rapid drying is achievable.

Due to the extremely short drying time from the large drying area, the product temperature during the critical period of the drying course only increases by a few degrees above the inlet temperature of the raw material. In accordance with the invention, it is possible by feeding frozen raw materials to perform a very quick freeze-drying process. After the drying, the dried product can assume a temperature approaching the temperature of the outlet air. Even at an air inlet temperature as high as 400°–500° C., the succeeding temperature increase is negligent during the drying course, and subsequently increases in the final phase of the drying in which the water content is close to that of the dried product.

The very low temperature increase of the product during the drying means that no appreciable denaturation of the protein content of the product takes place. By the comminution of the product, flavour substances and pigments bound in the product tissue are released. This is achieved solely as a consequence of the low and consequently gradual temperature increase to which the product is exposed during the processing and drying.

The continuous exposure of new wet surfaces and the connected rapid drying course create the basis for an extremely gentle drying of the products.

The object of the drying (which is a pure preservation method) is to dry a wet, quality-wise unstable product to a dryness which entails maximum stability.

During the said drying process, the products are normally subjected to a number of decomposing and quality reducing processes, such as oxidation of flavour and aroma substances, discolouration, tissue rupture by osmosis, build-up of concentration gradients of salts and soluble substances by diffusion, biological and enzymatic decomposition etc. All these quality reducing processes are dependent on time, temperature and water activity. For example, several of these processes are characterized by having a velocity maximum at some of the water activities which the products undergo during the drying.

Because of the very low temperature increase and the extremely fast drying course which characterize the present invention, the quailty impairing processes can thus be reduced to a minimum, and the natural and high quality of the raw material can be preserved in the dried product.

Compared with traditional convection drying principles (i.e. drying in air current) which can involve a heat consumption of at least 1000–1200 kcal/kg evaporated water, the method according to the invention consumes only 700–850 kcal/kg evaporated water. This is due to the thermal efficiency being very high. The reason for this is that the supplied heat is primarily used for evaporating the free water and only secondarily for heating the product.

The advantages of the method according to the invention are also apparent when comparing with the conventional drying processes, such as freeze-drying, furnace-drying and spray-drying. By the strong heat impact from outside and inwardly, which takes place in the last-mentioned two processes, a considerable product denaturation is accomplished. This affects both flavour and quality, as a strong heat impact on a product with relatively high water content causes a kind of boiling of the product, which at least as regards the proteins is comparable with a denaturation/coagulation. In case of freeze-drying, however, it is not strictly a boiling, but a real frost burst of the cells. In this connection, spray-drying can only be used for liquid products, such as milk or the like, which can easily be pulverized. Here the principle is a direct conversion of the raw material into a powder in a hot, vertical air current, which at a controlled rate provides for conveyance of the dry product to the discharge means. The relatively heavy, moist product is kept floating until most of the water has evaporated. In case of the other methods, the product is first dried in whole state, whereafter it is decomposed to the desired size. This is a method which from a viewpoint of energy consumption is very inexpedient as the evaporation rate decreases with the size of the product introduced.

The method used for exposing new surfaces is based on the impact principle, i.e. product against product in an air current. The air current, which is used as drying media, is simultaneously used for exposing new product surfaces. Due to the rotor/stator form, the considerable air flow through the swirl drying chamber will generate many turbulent air currents which accelerate the product to a very high speed required for comminuting the material by the products impinging against each other. The turbulent flow in the swirl drying chamber is very important, as a laminar flow could not provide the desired effect as regards comminuting the product. It is a characteristic feature of the impact principle that it is capable of bursting both hard and soft tissue types, i.e. shells or bones as well as meat and connective tissue. Further, the principle makes very modest demands on the size of the raw material, and it is possible to introduce whole claws and heads of sea crab as well as whole shrimp directly into the swirl drying chamber without prior comminution.

The swirl drying chamber may advantageously be a machine sold under the tradename Ultra-Rotor which today is used mainly for fine-grinding of chemicals, plastics, etc. Such a machine has a rotor being provided with a number of horizontal discs along the periphery of which a large number of radial plates are positioned, the said discs together forming many small chambers, and a stator having a grooved surface. When the rotor rotates at very high velocity turbulent air currents arise between the chambers due to the unevennesses of the stator and due to changes in the directions, velocity and acceleration of the air currents when passing in and out between the air chambers of the rotor.

The drying course is controllable by setting the following:

the temperature of the raw material. By lowering the inlet temperature of the raw material, the temperature of the product during the drying can be limited to any desired level. Advantageously, particularly sensitive materials can be dried at a temperature below the freezing point.

the temperature of the inlet air. By increasing the temperature, the capacity is increased simultaneously with the drying time being reduced.

the amount of air contra product quantity. After setting the temperature of the inlet air and the raw material, the heat economy is optimized during the drying through a minimization of the amount of air relative to the quantity of raw material.

the counter-pressure over the swirl drying chamber. The product is retained in the chamber by increased counter-pressure, and both fineness and dryness are increased in the finished product.

Examples and Description of the Preferred Embodiment

EXAMPLE 1

The object according to the invention was used for producing a powder of offal from sea crayfish. Thus claws and heads of sea crayfish were passed to the swirl drying chamber. These claws and heads were of a size of 15–20 cm and 5–7 cm, respectively, and had a water content of about 80%. To ensure homogeneous introduction into the chamber the material was coarsely comminuted in the conveyor screw to a size of about 5 cm. 350 kg raw material were introduced per hour. The chamber inlet air had a temperature of 450° C. and was introduced in an amount of 4000 $m^3$. After the processing in the swirl drying chamber the water content had been reduced to below 8–10%, and in the finished powder the grain size was below 85 $\mu$m in respect of 45% of the product, and below 150 $\mu$m in respect of all the product. The product was dried directly from frozen state as well as from unfrozen (or thawed) state. The state of the product before the drying was not important for the comminution properties, but only influenced the heat consumption, because extra heat energy was needed for thawing the product as well as for the water evaporation.

The conditions of the drying course entail that, under the influence of the very high temperature of the drying air, there is achieved a sterilizing effect on the product, i.e., because bacteria on the surface and in the outer material layer are killed when the material is introduced into the swirl drying chamber.

The powder from the drying chamber can be used directly, but in case of high demands on the particle size it may also advantageously be passed to classifying means of conventional type coupled after the chamber. By that means it becomes possible to remove oversize particles or material lumps from the flow of material leaving the chamber and return them to the chamber inlet.

The finished product from the swirl drying chamber is a pink dry powder which is usable as natural stock or flavour extract for processed fish products, such as shrimp or lobster soup and as additive in instant food. Due to the released flavour substances and pigments the finished product can replace a variety of the artificial additives used today.

EXAMPLE 2

A sea crayfish powder was produced by the method according to the invention from raw or boiled sea crayfish offal in the form of heads and claws of raw sea crayfish.

The raw material had a water content of about 80% calculated on total weight, and the product was dried under continuous comminution to a water content of about 10%.

The product was visually characterized by a pink colour and a distinct taste of sea crayfish.

After the drying and comminuting process the product had achieved a very fine granulation of the size 10–500 µm. This comminution causes a more or less total release of flavour and colour substances which otherwise would have been bound in the meat and shell structures. This makes the product especially suited for human food, as the product readily replaces a variety of the synthetic flavour substances and extracts used today.

As opposed to known flavour substances which mainly consist of a very small part of real flavour substances, and a very large part of salt and said like, the powder consists of 100% sea crayfish (apart from a residual water content of about 10%).

Due to the special process used for producing the products, there is also achieved very long storage life without use of preserving agents, as the product on account of the low water content and a certain kind of sterilization during the process does not make vey high demands on storage.

For example, the powder may form part of fish pies, soups and the like as a completely natural raw material since the gentle process by which the powder is produced in no way has denaturated the natural composition of the raw material, but has merely removed the majority of the water content.

The product or parts thereof, e.g. particles larger than 70–100 µm, may secondarily be used within the fodder industry as especially in this fraction there is a large calcium content as well as a certain astaxantine content.

When used within the fish fodder industry, it is possible to take advantage of the retained attractive parts of the product and the colourant astaxantine, in particular for use as trout or salmon fodder.

Laboratory analysis of the sea crayfish powder yielded the following results:

| Raw material: | Whole fresh or frozen sea crayfish or parts thereof (Norwegian Lobster). | |
|---|---|---|
| Description: | Colour: | Pink. |
| | Aroma: | Strong or delicate taste of sea crayfish. Freely flowing powder. |
| Product analysis: | Water | max. 7–10% of the powder |
| | Protein | max. 42% of the powder |
| | (N × 6.25) | |
| | Fat (Stoldt) | max. 9% of the powder |
| | Ash content | max. 40% of the powder |
| | Digestibility | min. 8% of the protein |
| | Salt (NaCl) | max. 6% of the powder |

EXAMPLE 3

Shrimp meal was produced by the method according to the invention from shells and other offal components from the shrimp shelling industry or alternatively from whole shrimp. The raw material may be of various kinds, but the experiment was carried out on the species *Pandalus Borealis*, generally called North Atlantic shrimp.

The water content in the raw material was about 80% calculated on total weight, and the product was dried under comminution to a water content of about 10%

The product was visually characterized by a pink colour and a distinct taste and smell of shrimp.

After the drying and comminuting processes the product achieved a very fine granulation to a granulate size of 10–500 µm. This comminution causes a release of the flavour and colour substances which otherwise would have been bound in the meat and shell structures, which makes the product well-suited for use in the fish fodder industry, especially for trout and salmon fodder. The shrimp's natural content of astaxantine, which is retained in the powder as a consequence of the gentle process, is assimilated in the fish body via the fodder and results in the desired red colouring of the meat.

Fodder experiments have demonstrated that fish prefer fodder with admixed shrimp meal of the kind produced by the method of the present invention over fodder without admixture, since the retained flavour substances from the shrimp attract the fish.

The very fine granulation of the powder further entails that the fodder coefficient in the finished fodder is lower than in corresponding known fodder types, which is a consequence of improved assimilation of the product in the digestive organs of the fish. An improved exploitation of the fodder also means less contamination of the water in which the fish stay, as they do not give off as much of the fodder. The last feature is a very significant point as regards environmental concerns.

Besides the use as fodder, the powder may also be part of human food as a replacement of synthetically produced flavour substances.

Laboratory analysis of the shrimp powder yielded the following results:

| Raw material: | Whole fish or frozen deep-water prawn (*Pandalus Borealis*) or parts thereof. | |
|---|---|---|
| Description: | Colour: | Red to violet, varying in dependence of the astaxantine content in the raw material. |
| | Aroma: | Distinct taste of fresh shrimp. Freely flowing powder. |
| Product analysis: | Water | max. 7–10% of the powder |
| | Protein | min. 64% of the powder |
| | (N × 6.25) | |
| | Fat (Stoldt) | max. 5% of the powder |
| | Ah content | max. 22% of the powder |
| | Digestibility | min. 85% of the protein |
| | Salt | max. 5% of the powder |

EXAMPLE 4

A fish powder was produced by the method according to the invention from raw residual products (fish meat from fish carcass after filleting), from fillet production or like fish processing. The experiments were carried out on parts from cod.

The water content in the raw material was about 80–85% calculated on the total weight, and after drying under comminution the product had a water content of about 10%.

The product was visually characterized by a pale to greyish colour and a relatively neutral smell. Like in the raw material, the taste is slightly sweet.

After the drying and comminuting process, the product achieved a very fine granulation with a particle size of 10–500 μm. This comminution causes release of flavour substances which would otherwise have been bound in the meat structure, and consequently the product is usable in foodstuffs in view of replacing the synthetically produced flavour substances and extracts used today.

Contrary to known flavour substances, which only to a very small extent consist of real flavour components and a very large salt component, the fish powder in question consists of 100% fish meat (apart from a residual water content of about 10%).

By the special production procedure, a very long storage life is obtained without using preserving agents; as the product, because of its low water content, the boiling and a certain degree of sterilization, makes no heavy demands on storage.

The powder may form part of fish pies, soups and the like as a completely natural raw material. As a consequence of the gentle production process, no denaturation of the natural composition of the raw material is effected apart from a reduction in the water content.

The powder is immediately usable in all situations requiring fish taste or requiring an extra water uptake in the product. Under normal circumstances the fish powder may take up about 250–270% of its own weight. This property is particularly utilizable in pies, fish sausages and the like, where it is in the interest of the producer to bind the free water.

The water uptake further means that the product can be used as binder in the above or like products.

Laboratory analysis of the fish powder yielded the following results:

| Raw material: | Clean-offs from filleting white roundfish (cod). | |
|---|---|---|
| Description: | Colour: | Light brown to grey. |
| | Aroma: | Delicate taste of fresh roundfish. |
| | | Freely flowing powder. |
| Product analysis: | Water | max. 7–10% of the powder |
| | Protein (N × 6.25) | min. 89% of the powder |
| | Fat (Stoldt) | max. 3% of the powder |
| | Ash content | max. 6% of the powder |
| | Digestibility | min. 98% of the protein |
| | Salt | max. 2% of the powder |

I claim:

1. A method for drying moist starting material lumps, having a water content of up to 85%, comprising:
    a) introducing the material into a swirl drying chamber in which it is accelerated in an air current composed of a multitude of turbulent air currents of sufficiently high air velocity, so that water is evaporated and the material lumps continuously collide with each other, and disintegrate into smaller pieces to expose new surfaces of rupture until a final product is obtained having a particle size of 10–500 μm and a maximum residual water content below 10%;
    b) passing air into the drying chamber to form the multitude of currents, which air has a temperature of between about 350° and 450° C., the choice of the exact temperature depending at least partly on inlet temperature of the starting material and at least partly on disintegration rate of material, said air being introduced in an amount adjusted according to the amount of starting material introduced per time unit, so that free water in the material immediately escapes from the exposed surfaces of rupture by evaporation, said evaporation contributing to the cooling of the final product, thereby protecting and preserving the aroma and flavor components as well as the proteins and vitamins; and
    c) retaining the material in the drying chamber by exerting a counter-pressure to regulate the air throughput until the predetermined particle size and water content of the product have been established.

2. A method according to claim 1, wherein any material lumps, the size of which exceed the desired size, are separated from the end product by means of a classifying device and returned to the inlet of the chamber.

3. A method according to claim 1, wherein the starting material has a water content of about 80%, which on drying is reduced to 7–10%, and the air introduced into the chamber has a temperature of 450° C.

4. The method of claim 1 wherein the energy used in the method is from 700–850 Kcal per Kg of water evaporated.

* * * * *